United States Patent [19]

Tawada et al.

[11] 4,433,097

[45] Feb. 21, 1984

[54] VINYL CHLORIDE RESIN TALC-EMBEDDED COMPOSITION AND METHOD OF MANUFACTURING SAME

[75] Inventors: Yoshihisa Tawada, Osaka; Tetsuro Yamamoto, Kobe; Minoru Ushioda, Amagasaki; Kazuo Saito, Nishinomiya, all of Japan

[73] Assignee: Kanegafuchi Kagaku Kogyo Kabushiki Kaisha, Osaka, Japan

[21] Appl. No.: 226,784

[22] Filed: Jan. 21, 1981

[30] Foreign Application Priority Data

Jan. 22, 1980 [JP] Japan ................................. 55-6586
Feb. 12, 1980 [JP] Japan ................................ 55-16195

[51] Int. Cl.$^3$ ........................ C08F 2/44; C08F 14/06; C08L 27/06; C08K 3/34
[52] U.S. Cl. .................... 524/789; 523/209; 524/451; 524/567; 524/834; 524/851
[58] Field of Search ............... 260/42.14, 42.53, 42.49, 260/29.6 NR; 526/194; 524/851, 789, 451, 567, 834; 428/407; 523/209

[56] References Cited

U.S. PATENT DOCUMENTS

| | | | |
|---|---|---|---|
| 3,157,614 | 11/1964 | Fischer | 260/42.49 |
| 3,265,644 | 8/1966 | Herman et al. | 260/42.14 |
| 3,305,498 | 2/1967 | Herman et al. | 260/42.49 |
| 3,400,094 | 9/1968 | Testa | 260/42.49 |
| 3,502,611 | 3/1970 | Palmer et al. | 260/42.49 |
| 3,546,158 | 12/1970 | Champion et al. | 260/42.49 |
| 3,855,162 | 12/1974 | Durand et al. | 260/42.49 |
| 3,899,473 | 8/1975 | Johansson | 526/194 |
| 3,919,159 | 11/1975 | Burns | 260/42.49 |
| 3,971,753 | 7/1976 | Frechtling et al. | 260/42.14 |
| 3,996,173 | 12/1976 | Heichele et al. | 260/42.49 |
| 4,090,994 | 5/1978 | Nagano et al. | 260/42.53 |
| 4,132,700 | 1/1979 | Stephens et al. | 260/42.14 |
| 4,137,216 | 1/1979 | Lemper et al. | 260/42.53 |

OTHER PUBLICATIONS

Chem. Abs. 77-140927 (1972) Shiraishi et al. Japan 72-11661.
Derwent Abst. 24247t/15 JA-7211661.
Derwent Abst. 40613c/23 Apr. 4, 1980, Kanegafuchi Chem. (J55056144).
Derwent Abst. 54295c/31 Jun. 17, 1980, Kanegafuchi Chem. (J55080412).
Derwent Abst. 56040c/32 Jun. 25, 1980, Kanegafuchi Chem. (J55084345).
Derwent Abst. 50212c/29 Jul. 9, 1980, Kanegafuchi Chem. (EP-12990).
Derwent Abst. 59300c/34 (Jul. 5, 1980), Kanegafuchi Chem. (J55089346).
Derwent Abst. 71503w/43 (May 17, 1975), Agency Ind. Sci. Tech. (J50056474).
Derwent Abst. 72601b/40 (Aug. 24, 1979), Kanegafuchi (J54107948).
Derwent Abst. 16723c/10 (Feb. 28, 1980), Dynamit Nobel (DT2837173).

*Primary Examiner*—John C. Bleutge
*Assistant Examiner*—Herbert J. Lilling
*Attorney, Agent, or Firm*—Moonray Kojima

[57] ABSTRACT

Composition and method of manufacturing same, wherein a vinyl chloride resin has talc therein in direct contact with vinyl chloride based polymer particles without any intervening material therebetween.

16 Claims, 7 Drawing Figures

VINYL CHLORIDE RESIN TALC-EMBEDDED COMPOSITION AND METHOD OF MANUFACTURING SAME

BACKGROUND OF THE INVENTION

This invention relates to a vinyl chloride type resin composition comprising a reinforcing agent, and a method of manufacturing same, and more particularly to such method and composition wherein impact strength and fabricability are substantially improved.

In the prior art, inorganic fillers have been used mixed together with various resins, such as PVC, to impart mechanical strength to the resin. For example, glass fibers and asbestos, have been used to impart various properties to polyvinyl chloride. However, use of such fillers, is not wholly satisfactory because of the unidirectionality of the tensile strength properties, namely, the tensile properties in the direction of flow are enhanced, but the tensile properties in the direction perpendicular to that of the flow is seriously degraded. Moreover, the impact resistance specially characteristic of the polyvinyl chloride resin is notably impaired by the use of such fillers.

A possible alternative is the use of mica or talc as a filler, since these materials have low anisotropy in properties. However, disadvantageously, mica is incapable of manifesting any reinforcing property and is low in impact strength, and hence is not practically useful. Talc has some reinforcing property but generally exhibits poor impact resistance. Use of very fine sized particles of talc can improve the impact resistance. However, such very fine sized particles are difficult to disperse uniformily in the resin during the steps of blending and molding. Thus, the composite mixture of, for example, PVC and the talc, suffers from dispersion of the properties. If the composite mixture is produced with very fine particles of talc to improve impact resistance, disadvantageously, the resistance has been found to be lowered to less than the impact resistance of pure unreinforced PVC. The different properties of the composite mixture, therefore stands in the way of practical use of such composite mixture of talc and PVC, wherein such composite mixture is by using conventional mixing and molding techniques.

The impact resistance of a composite mixture containing a blend of resin particles and dispersed inorganic particles can be improved by enhancing the uniformity of dispersion of the inorganic particles in the matrix, such as the PVC matrix. Since the particles of inorganic fillers are extremely small compared to the size of the matrix particles, being for example some hundreds of microns in the case of a suspension polymerized PVC, prior to the blending, it is difficult to mechanically uniformily disperse the the inorganic particles. If uniform dispersion is obtained by blending for a length of time sufficient to ensure thorough mixing, the amount of time expended would make such an operation practically and economically infeasible.

Also, the prior art has taught polymerization of resins in the presence of inorganic substances. For example, Japanese Patent Publication No. 11,661/1972 discloses a method of giving to a filler having a specific surface area of not less than 1 m$^2$/g a surface treatment using a vinyl polymer by adding to a suspension of said filler in water 0.5 to 40% based on the filler, of vinyl monomer and polymerizing the resulting mixed system. Although this method improves the mixed condition of the polymer and the filler, disadvantageously, the filler particles are expelled out of the polymer particles as the polymerization proceeds and upon completion of the polymerization, absolutely no filler particles were found to be embedded within the polymer particles. Japanese Patent Publication No. 2,659/1975 discloses a procedure which precludes otherwise possible decline of polymerization velocity by asbestos by adding to asbestos treated with silane 5% by weight of alcoholic water and a monomer and subjecting the resultant mixed system to bulk polymerization. Japanese Patent Publication No. 33,915/1975 discloses a study aimed at attaining dispersion of a stabilizer and a slidant as well as a filler in a system under polymerization. These prior methods are deficient in that the inorganic substances are not embedded or dispersed within the the polymer particles, nor is at least one surface of the inorganic substances in direct contact with the polymer particles without any intervening material therebetween. In some cases, the inorganic filler may partially adhere to the surface of the polymer particles, but with an intervening material between the filler surface and the polymer particle.

Inorganic substances by nature have poor affinity for organic substances. Thus, even when the inorganic substances are dispersed in a monomer blend or a monomer mixture blend, preparatory to polymerization, they are expelled from the organic particles with the progress of the polymerization. This is also true for talc, which is used in our invention. When polymerization is carried out by conventional methods, the talc will not become embedded within the polymer particles. They may, however, partially adhere to the surface of such polymer particles, but always with an intervening material between the talc surface and the surface of the polymer particle, for example. The produced composite having such partially adhered talc, for example, will have properties, e.g. impact resistance, which are no better than those of products obtained by mechanically mixing talc and polymer particles.

Thus, in summary, in the art there are disclosed compositions formed of a mechanical mixture of talc and polymer particles with intervening material therebetween, and compositions formed by conventional polymerization processes wherein talc may be partially adhered to the polymer particles, but with intervening material therebetween. It was not known in the prior art, any method which produced a composition of talc and vinyl chloride resin wherein the talc was in direct contact with the polymer particles without any intervening material between the talc and the polymer particle, nor was there known any method wherein the talc was caused to be embedded within the polymer particles. The prior compositions thus were deficient in inpact resistance and tensile strength.

SUMMARY OF THE INVENTION

An object of the invention is to eliminate the aforementioned and other disadvantages and deficiencies of the prior art.

Another object is to produce a resin composition wherein talc particles have at least one broad surface thereof bonded directly to the polymer particles and preferably having the entire talc particle embedded within the polymer particles with more than one surface of the talc bonded directly to the polymer particles.

A further object is to provide a method which enables the talc particles to be embedded within polymer particles and be directly bonded thereto.

Another object is to improve the tensile strength and impact resistance of vinyl chloride based resins, by using talc as a reinforcing agent, which talc is in direct contact with the vinyl chloride polymer particles without any intervening material therebetween.

A still further object is to provide a method wherein at least one broad surface of the talc particles is bonded directly to polymer particles surfaces without any intervening material therebetween.

The foregoing and other objects of the invention are attained by a method wherein talc particles are first wetted with vinyl chloride monomer or a mixture of a major proportion of vinyl chloride monomer and a minor proportion of other vinyl monomers copolymerizable therewith. Then an aqueous medium and, optionally, a dispersant are added to the resulting blend. Then, the blend is polymerized using an initiator which is soluble in the monomer or monomer mixture. The talc particles are preferably of a size distribution wherein preferably no more than 20%, and more preferably 15%, of the particles exceed a Stokes diameter of $10\mu$. As a result, the talc particles are substantially embedded in and surrounded by the resulting polymer particles. When the resulting composition is molded, the molded product advantageously has high impact resistance and excellent tensile strength.

In an alternative embodiment method, talc particles are first dispersed in an aqueous medium, such as water, to form a slurry mixture without the presence of the vinyl chloride monomer or mixture of vinyl chloride monomer and other vinyl monomer copolymerizable therewith. Then, the monomer or monomer mixture is added to the slurry. Then, the resulting mixture is polymerized in the presence of a non-hydrolyzable dispersing agent, such as polyethylene oxide or methyl cellulose, or in the absence of any dispersing agent. As a result, at least one broad surface of the talc particle is directly bonded to the polymer particles without any intervening material therebetween. Products molded from such compositions have excellent impact resistance, which may be slightly lower than for the case wherein the talc particles are embedded in the polymer particles.

A feature of the invention is a method wherein talc particles are first wetted, such as by stirring or vigorous agitation, with vinyl chloride monomer or a mixture of vinyl chloride monomer in major proportion and other vinyl type monomers copolymerizable therewith in minor proportion; then aqueous medium and, optionally, a dispersant are added to the blend; and the blend is then polymerized with an initiator which is soluble in the monomer or monomer mixture, such as organic peroxide or azo compound.

Another feature is use of a polar compound, such as carboxylic acid, alcohol, amide or derivatives thereof, dissolved in the monomer or monomer mixture prior to polymerization.

A further feature is the use of talc particles having a size distribution of preferably not more than 20%, and more preferably not more than 15%, of particles exceeding Stokes diameter of $10\mu$.

Another feature is the initiator being first mixed in the talc prior to wetting, or is dissolved in the monomer or monomer mixture, or blended in the resultant blend prior to polymerization.

A further feature is the start of polymerization within preferably one hour of the mixing of the talc and monomer or monomer mixture.

Another feature is the adhering of below 1% water to the talc.

A further feature is the use of a water soluble high polymer as a dispersant.

Another feature is a method wherein talc is mixed with an aqueous medium to form a slurry mixture, adding vinyl chloride monomer or mixture of vinyl chloride monomer in major proportion and other vinyl type monomers copolymerizable therewith in minor proportion; and polymerizing the resulting blend in the presence of a non-hydrolyzable dispersing agent or in the absence of a dispersing agent.

A further feature is the composition comprising talc particles having at least one surface thereof directly bonded to polymer particles of a polymer having a major proportion of vinyl chloride.

Another feature is a composition comprising talc particles embedded in polymer particles comprising a major proportion of vinyl chloride.

Another feature is a composition wherein the talc particles have a size distribution of preferably not more than 20%, and more preferably not more than 15%, exceeding Stokes diameter of $10\mu$.

A further feature is a composition wherein the talc content is from 1 to 30 weight percent in the molded state.

Another feature is the mixing of the composition having talc with polyvinyl chloride resin having less than 1% by weight or substantially no talc.

DETAILED DESCRIPTION OF THE PREFERRED EMBODIMENTS

Figure 1:
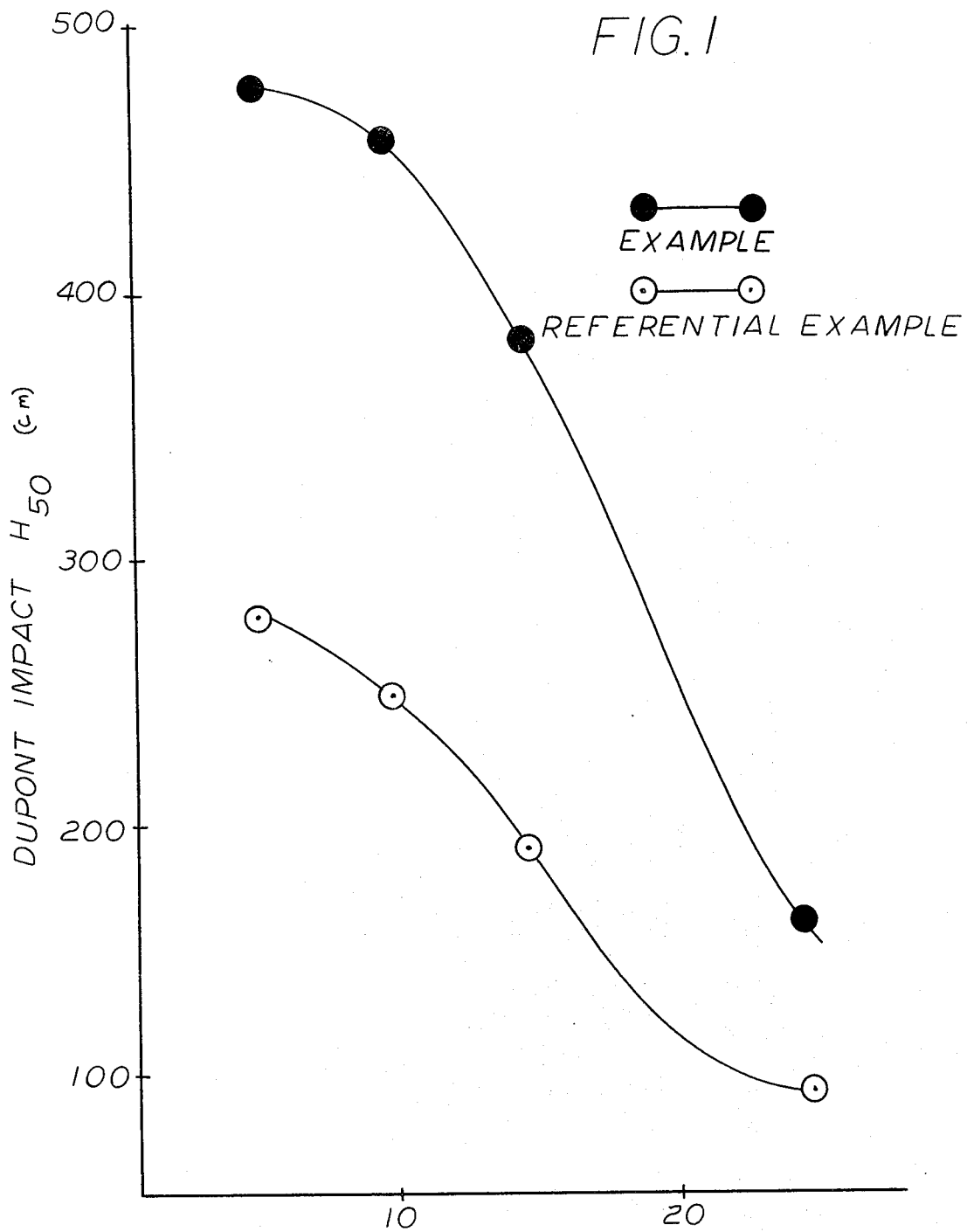
FIGS. 1 and 2 depict graphs showing the relationship between the impact resistance and the size distribution of the talc particles (FIG. 1), and the talc content (FIG. 2), respectively.

The inventive method produces polymer particles which have talc embedded and dispersed therein. In another embodiment, the inventive process produces polymer particles having talc particle in direct contact and bonded with the polymer particles or grains without any intervening material therebetween. Thus, in both cases, due to the direct contacting of the talc particles with the polymer particles, and without any intervening material therebetween, the resulting compositions when molded have notably and surprisingly high impact strength and excellent tensile strength.

The talc used in this invention may be a monoclinic mineral of a composition represented typically as $Mg_3(Si_4O_{10})(OH)_2$. The talc may be of a grade obtained by pulverizing same. The pulverized talc particles have the shape of thin scales. Thus, herein reference to surface means the broad flat surface. The pulverization of talc for use in his invention may be performed by any desired method. The talc particles obtained by pulverization, however, should preferably have a size distribution wherein not more than preferably 20%, and more preferably not more than 15%, of the particles have a Stokes diameter exceeding $10\mu$. This is determined by a centrifugal sedimentation method. The pulverization is desired to be carried out by use of a pulverizing machine, such as the machine produced by Hosokawa Iron Works and marketed under the Trademark "SuperMicron Mill", belonging to the class designated as impact mills. It is further desirable to produce talc particles, including those of Stokes diameter exceeding $10\mu$ in a proportion not exceeding preferably 20% or more preferably 15%, by use of a wind-powered classifier, such as the machine known as "Microplex" by Yasukawa Electric Co. Ltd, or a machine known as "Micron Separator" made by Hosokawa Iron Works, or a cyclone type classifier.

The monomers which are used in this invention include vinyl chloride monomer, and a mixture of a major proportion of vinyl chloride monomer and a minor proportion of one or more vinyl type monomers copolymerizable therewith. Examples of such other monomers are vinyl esters of organic acids, vinylidene chloride, vinylidene fluorochloride, symmetric dichloroethylene, acrylonitrile, methacrylonitrile, alkylacrylate esters, alkylmethacrylate esters, alkyl esters of unsaturated dibasic organic acids such as dibutyl fumarate and diethyl fumarate, unsaturated hydrocarbons, aryl compounds, conjugate and cross-linked conjugate ethylenically unsaturated compounds.

The vinyl chloride type resin composition of the present invention can be identified and studied by a procedure comprising the steps of impregnating the polymer particles obtained from the aforementioned monomer with methyl methacrylate, then polymerizing the impregnated polymer particles, cutting a thin section from a sample of the resultant polymer particles with a microtome, observing the thin section under a penetrating electron microscope thereby to detect the amount and nature of the talc embedded within the polymer particles.

Polyvinyl chloride is conventionally produced by polymerizing vinyl chloride monomer in conjunction with water, a dispersant and an initiator. When this polymerization is carried out in the presence of an inorganic filler, the inorganic filler remains separate from the produced polymer particles. Even after the inorganic filler has been treated with an organic surface treating agent, it may slightly adhere to the surface of the polymer particle with some intervening material therebetween, and is not embedded within the polymer particles. For example, when polymerization is performed in the presence of untreated calcium carbonate, the calcium carbonate remains separate from the produced polymer particles. This is because calcium carbonate has a higher affinity for water than for the organic compounds. Thus, the calcium carbonate is prevented from being dispersed within the monomer. When calcium carbonate is treated with a fatty acid for the purpose of acquiring improved affinity for the monomer, the treated calcium carbonate is dispersed within the monomer, but is not embedded at all within the produced polymer particles. The treated calcium carbonate may be partially adhered to the surface of the polymer particles with intervening material therebetween. An explanation for this action may be that inspite of the enhanced affinity for the monomer, the treated calcium carbonate dispersed in the monomer is gradually expelled out of the polymer particles with the progress of polymerization. Talc behaves similarly when polymerization is carried out using conventional methods, such as by placing the talc, vinyl chloride monomer, an aqueous medium, a dispersant and an initiator into an autoclave and subjecting the resulting mixed system to polymerization. In this case, the talc remains substantially separate from the produced polymer particles or at best is partially adhered, but not in direct contact with, to the surface of the polymer particles with intervening material therebetween.

In contrast to the foregoing, the invention accomplishes embedding of the talc within the polymer particles or substantial direct contact or bonding of at least one surface of the talc to the polymer particle without any intervening material between the talc surface and the polymer particles.

One embodiment of the invention involves stirring talc with vinyl chloride monomer or a mixture of a major proportion of vinyl chloride monomer and a minor proportion of other vinyl type monomers copolymerizable therewith, until the talc is substantially wetted with the monomer or monomer mixture, then adding an aqueous medium and, optionally, a dispersant to the resulting blend and polymerizing this blend with an initiator soluble in the monomer or monomer mixture. The initiator may be suitably treated and incorporated into the talc, or dissolved in the monomer or monomer mixture in advance, or added to the blend immediately before the start of polymerization. It is important that the talc be wetted with the monomer or monomer mixture.

Unlike other inorganic fillers, talc possesses a fair degree of affinity for organic substances and is easily wetted by the monomer or monomer mixture. For facilitating the embedding of the talc, it is desirable to control the amount of water allowed to adhere to the talc particles, to be below about one percent by weight. Ample wetting of talc may be obtained by stirring or vigorous agitation. After the addition of the aqueous medium and the dispersant, the polymerization of the mixed system should preferably be started within a short time. The aqueous medium and the dispersant are blended with the monomer containing the dispersed talc. The blending or stirring may be continued until the start of the polymerization. If the time between the adding of the aqueous medium and dispersant and the polymerization is long, then the amount of talc which passes into the aqueous medium increases, the amount of talc which escapes being embedded within the polymer particles increases and the talc in the aqueous medium goes to greatly reduce the size of the polymer particles. The polymerization, therefore, is desired to be started preferably within one hour, although the duration is more or less variable with the conditions of stirring.

When polymerization is performed by use of a large polymerization vessel, the elevation of temperature requires much time and the duration preceding the start of polymerization is lengthened. In this case, it is desirable to have the talc wetted with and dispersed in the monomer or monomer mixture after a compound which is soluble in the monomer or monomer mixture and having a polar group, has been dissolved in the monomer or monomer mixture. When such compound containing polar group is added, the amount of talc which passes into the aqueous medium can be notably decreased and the efficiency with which the embedding of talc takes place can be enhanced, even if the stirring is continued after the addition of the aqueous medium and the dispersant and until time of polymerization. These desirable effects are obtained even when the duration of the stirring up to the start of polymerization is lengthened. The polar group may be selected from the group consisting of carboxylic acid, alcohol, amide and derivatives thereof. It may be polymeric or non-polymeric. Examples of such compounds containing polar groups are polymeric carboxylic acids, such as acrylic acid, methacrylic acid, itaconic acid, maleic acid and fumaric acid and esters thereof; aliphatic carboxylic acids, aromatic carboxylic acids and esters thereof; aliphatic alcohols, and aliphatic amides. Although the amount of these compounds to be used is free selected, it is preferably to us an amount within the range of from 0.1 part by weight to 10 parts by weight, based on 100 parts by weight of talc. All the percents and parts used herein are in terms of weight unless the contrary is set forth. When the amount is less than 0.1 part, the effect of addition of this compound is less than expected. When the amount is greater than 10 parts, the added compound may plasticize the polymer and impart excessive slidability to the produced composition, even though the effect of the addition may be greater. Generally, therefore, such excess addition proves disadvantageous.

Any initiator which is soluble in the vinyl chloride monomer or monomer mixture and now generally used, may be used in the inventive method. For example, organic peroxides and azo compounds are useful. Typical examples are azo-bis-isobutyronitrile, azo-bis-dimethylvaleronitrile, azo-bis-dimetnylmethoxyvaleronitrile, lauroyl peroxide, t-butyl peroxy-bivalate, diisopropyl peroxydicarbonate and acetyl cyclohexyl-sulfonyl peroxide. The amount of initiator to be used may be the same as conventionally used.

With a view to precluding the formation of scales and adjusting the particle size of the polymer, the dispersant is desired to be a water-soluble high polymer. Typical examples are partially saponified polyvinyl alcohol, cellulose derivatives and polyethylene oxide.

The talc content in the composition of the invention is desired to be not more than about 50 weight percent based on the amount of talc in the polymer particles. With the method of this invention, the polymerization starts on the surface of the talc particles and substantially all of the talc is embedded within the polymer particles by the time conversion of the monomer or monomer mixture to polymer or copolymer reaches a little below 10%. Theoretically, therefore, the composition containing a desired amount of talc within the polymer particles can be obtained. If the talc content in the polymer composition exceeds about 50% by weight, the formed composition is no better than what is obtained by mechanically mixing the polymer and the talc. The talc content, therefore is not desired to exceed this level. According to the above method, the talc in the resultant composition is in direct contact (i.e without any intervening material between the talc surface and the polymer particles) with the polymer particles which are also called grains at the entire surfaces of the talc and is thus distributed uniformly within the grains.

In another embodiment, a composition may be obtained wherein one surface of the talc is in direct contact with the polymer particle at their interface without any intervening material therebetween. Such compositions may be prepared using the following procedure. The talc is first sufficiently dispersed in an aqueous medium, such as water, to form a slurry mixture without the presence at that time of vinyl chloride monomer or a mixture of major proportion of vinyl chloride monomer and a minor proportion of other vinyl type monomers copolymerizable therewith. Then, the monomer or monomer mixture is added to the slurry. Then, the resultant mixture is polymerized in the presence of a non-hydrolyzable dispersing agent or in the absence of a dispersing agent. The non-hydrolyzable dispersion agent may be polyethylene oxide or methyl cellulose, anyone of which is not hydrolyzed in an alkaline solution.

The composition is molded after a stabilizer, a slidant, and, optionally, a pigment and/or other additives, have been added thereto. In the course of molding, the merits of the invention are best manifested to advantage when the talc content in the composition is from one to 30 weight percent. since the talc content is variable with the particular use found for the composition the talc content may be adjusted by adding to the talc containing composition, ordinary polymer not containing any talc. For example, to obtain a molded article with a 20% talc content, a talc containing composition having 40% talc content, may be diluted with a polymer not having any talc therein in substantially equal quantity. In another example, wherein the talc content is 60%, in order to obtain a mold composition having 20% by weight, it would be necessary to dilute the talc containing composition with twice the amount of composition not having any talc therein. In this case, however, the talc may not be uniformily dispersed within the molded article, and the molded article has properties which are no better than those produced by mechanical mixing of talc and polymer particles (i.e. not having talc embedded in the polymer particles or in direct contact with one surface of the talc). So far as the talc content in the composition is not more than 40%, this talc content can be adjusted by mixing with polymer compositions not having any talc therein, and preserve the impact resistance in the molded article.

The composition of the invention wherein one surface of the talc is in direct contact with the polymer particle exhibits slightly lower impact resistance than for the case of the talc being embedded within the polymer particles. In both cases, the talc containing compositions may be mixed with various additives such as slidant, etc, and molded such as by a low kneading method. The talc having one surface in direct contact with the polymer particles appears to cause the polymer particles to be very small. This may account for the slightly lower impact strength.

Talc has the ability to promote removal of hydrochloric acid from the vinyl chloride type resin. The polyene which is produced as a result of this removal of hydrochloric acid may degrade the impact resistance of the vinyl chloride type resin containing talc. For the purpose of preventing the formation of this polyene and enhancing the impact resistance, it is advantageous to use a compound containing an amide bond, such as, for example, an alkylene-bis-fatty acid amide, methylated fatty acid amide, a copolymer thereof having a melting point of not more than 200° C. or a methoxy methylolated polyamide, when the polymer and talc are mixed. In the case of this invention, when the particle size of the polymer is small (100 mesh or smaller), the addition of such a composition in conjunction with a stabilizer and a slidant manifests its effect to advantage. When the particle size of the polymer containing talc embedded therein increases to above 100 mesh size, the addition made after polymerization bring about no substantial effects. Consequently, during the molding of the formed composition, polymer particles of a large particle size are carbonized to a point where its impact resistance decreases.

In the composition of the invention, since the talc and the polymer remain in direct contact with each other, such compounds, if added after the polymerization, will not readily permeate to the interface of talc. This trend becomes conspicuous in proportion as the particle diameter of the polymer increases. It is thus necessary that such compound should be added before the polymerization is ready to start. The amount of such compound to be used is between 0.1 to about 25% by weight, based on talc.

The molding of the inventive composition can be carried out by any desired method. A stabilizer and a slidant are desirably employed together with the composition to form the molding material. These additives may be, for example, lead type stabilizers, such as tribasic lead sulfate and dibasic lead stearate, tin type stabilizers, such as dioctyl tin maleate and dibutyl tin maleate, Ca-Zn type stabilizers, Cd-Ba type stabilizers, metallic soaps, higher fatty acids and derivatives thereof; and slidants, such as low molecular polyethylene and normal paraffin, depending on the molding machine and molding conditions employed or desired. These are added to the composition together with other optional additives, such as ultraviolet ray absorbent, pigment, and the like. In addition to adding vinyl chloride based resins to dilute the talc content, other resins may be used, such as ABS, MBS, chlorinated polyethylene or EVA, to further improve impact resistance. Other agents capable of improving the moldability of the composition may be used. Moreover, other fillers may be used, such as, for example, calcium carbonate, gypsum gypsum fibers, asbestos, mica, calcium silicate or galss fibers, etc. Particularly useful as a filler, such as calcium carbonate, are those wherein the size distribution of the particles of such fillers has not more than 12% of Stokes diameters exceeding 10μ. After addition of these additives, the composition is homogeneously mixed as by a high speed mixer and then molded by such procedure as rolling, extrusion, injection and melt spinning.

Figure 2:
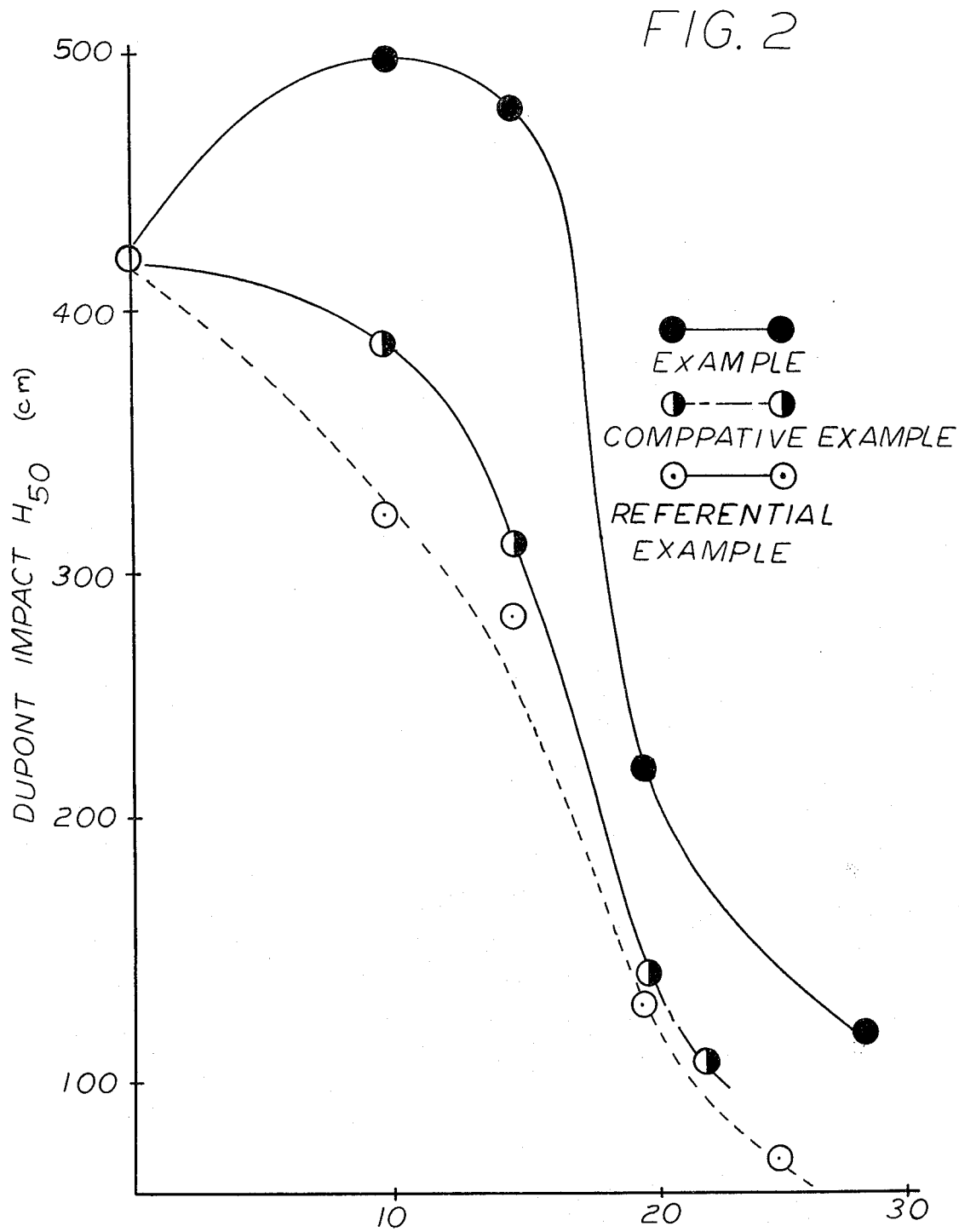

FIGS. 1 and 2 depict, respectively, the relationship of impact strength to size distribution of the talc particles, and to the content of the talc particles in the composition. The upper curve having solid circles are for the working examples of the invention. The intermediate curve having semi-solid circles are for the comparative example, and the lower curve having open circles are for the referential example. In FIG. 1 the curves are measured for the different percentages of the talc particles having Stokes diameters exceeding 10μ, and ranges from below 10%, about 4%, to above 20 percent.

In FIG. 2, the curves are for different talc contents in the molded articles and ranges from zero to about 30%. These graphs will be further discussed with reference to Examples 5 and 6 hereinbelow.

Figure 3:
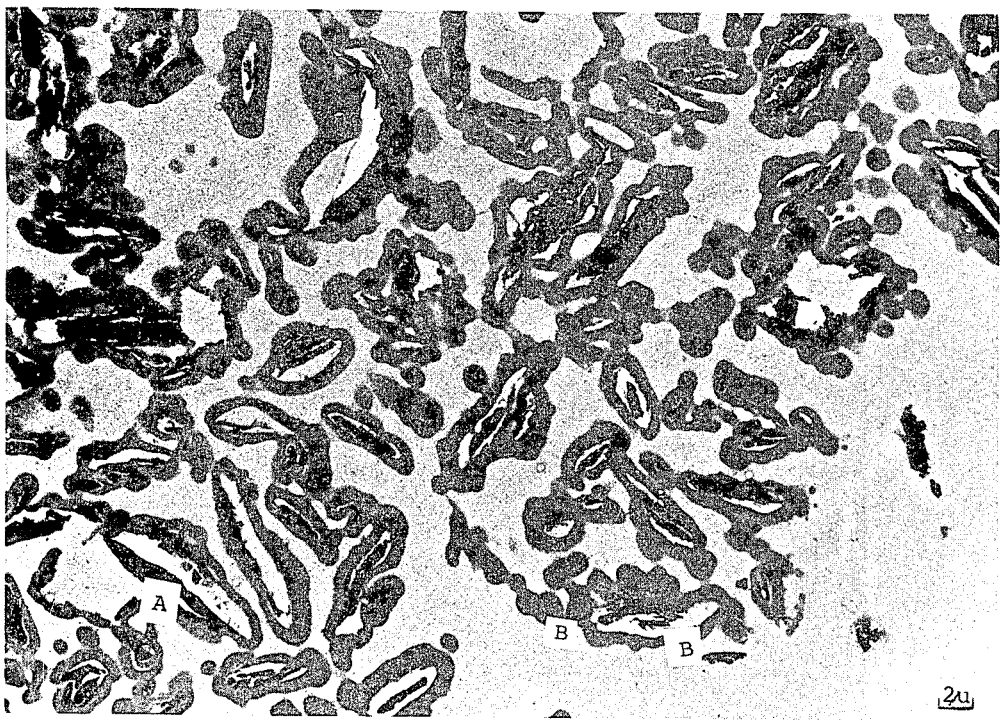
FIGS. 3, 4, 5, 6 and 7 are electron photomicrographs of the interiors of the polymer particles obtained in Example 1, Comparative Example 1, and Examples 7, 8 and 9, respectively.
Figure 4:
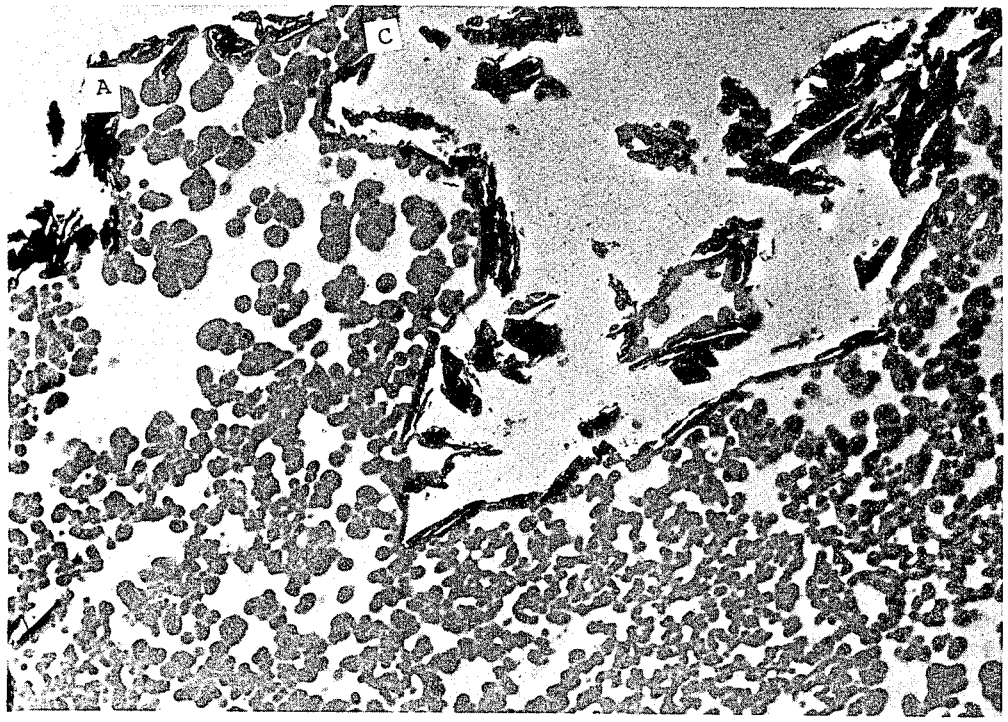

The photomicrographs depict the compositions obtained in the examples and molded. These FIGS. 3,4,5,6 and 7 will be referred to in connection with the below discussion of the examples. The photomicrographs are of 4,800 magnifications. In FIGS. 3 and 4, the dark parts labelled "A" are the talc particles. The grey parts marked "B" are the primary polymer particles (either vinyl chloride monomer or a mixture of major proportion of vinyl chloride monomer and a minor proportion of other vinyl type monomers copolymerizable therewith). The parts marked "C" are the surfaces of the polymer particles. Similar parts are not labelled in the other photomicrographs, but, viewing of these other micrographs will show the identifications of the parts. The relative sizes are measured by the scale shown at the lower right of the micrograph of FIG. 3.

The present invention will now be further illustrated with actual working examples, which examples are for illustrative purposes, and are not to be considered to be limiting of the invention.

EXAMPLE 1 and COMPARATIVE EXAMPLE 1.

Talc produced in China was pulverized and classified by a Super-Micron Mill (made by Hosokawa Iron Works) and further classified by a Micron-Separator (made by Hosokawa Iron Works) to produce pulverized talc (A in Table 1) wherein those particles having Stokes diameters exceeding 10μ accounted for 4.8% of the entire number of particles.

In a polymerization vessel having an inner volume of 16 liters and provided with Brumagin type impeller, one each in two steps, 1.34 kg of talc A, 1.34 g of ethylene-bis-stearylamide (EBS) as an agent for preventing removal of hydrochloric acid, and 2.03 (0.05% by weight based on monomer) of di-2-ethylhexyl-peroxy-dicarbonate (OPP) as an initiator were kept under repeated displacement with nitrogen for removal of formed oxygen. Then, 4.05 kg of vinyl chloride monomer was added to the polymerization vessel and stirred at room temperature for 20 minutes, with the impeller rotated at a speed of 1000 rpm. Subsequently, 8.3 kg of deionized water having 2.84 g (0.7% by weight based on monomer) of polyethylene oxide (PEO, molecular weight 160,000 to 200,000) dissolved therein as a dispersant was added. The resultant mixture was stirred at the same speed, 1000 rpm, of the impellers rotation, and immediately the temperature of the system was elevated to 58° C. to start the polymerization. About five hours after the start of the polymerization, the inner pressure of the vessel fell to 1 kg/cm². At this point, the unaltered monomer was recovered, and the remaining polymerization mixture was dehydrated and dried at 60° C. for 24 hrs, to produce about 4.5 kg of a composition. From the 60 mesh pass portion of the composition, a sample of about 2 g was collected and burned in an electric furnace at 700° C. Consequently, the talc content was found to be about 29.3% by weight.

As a Comparative Example 1, 1.34 kg of talc A, 8.3 kg of deionized water, 28.4 g of polyethylene oxide, 13.4 g of EBS and 2.03 g of OPP were placed in a 16 liter polymerization vessel and stirred at 1000 rpm under repeated displacement of nitrogen for expulsion of formed oxygen. Then, 4.05 kg of vinyl chloride monomer was added thereto and the temperature of the system was immediately elevated to 58° C. to start the polymerization. When the inner pressure of the vessel fell to 1 kg/cm² five and one half hours after the start of polymerization, the unaltered monomer was removed, and the remaining polymerization mixture was dehydrated and dried at 60° C. for 24 hours to produce about 4.2 kg of a composition.

TABLE 1

|  | A | B | C | D |
|---|---|---|---|---|
| >10μ | 4.8% | 9.6% | 14.3% | 25.3% |
| 10~8μ | 3.1% | 3.6% | 5.6% | 5.3% |
| 8~6μ | 2.1% | 3.9% | 8.7% | 6.2% |
| 6~5μ | 1.7% | 1.8% | 4.5% | 3.5% |
| 5~4μ | 3.0% | 3.6% | 6.8% | 5.4% |
| 4~3μ | 4.8% | 5.7% | 7.8% | 6.4% |
| 3~2μ | 9.8% | 13.3% | 11.3% | 12.8% |

TABLE 1-continued

|  | A | B | C | D |
|---|---|---|---|---|
| 2~1μ | 26.9% | 28.8% | 19.7% | 13.1% |
| 1~0.8μ | 8.5% | 5.8% | 3.6% | 3.9% |
| 0.8~0.7μ | 4.4% | 2.4% | 1.6% | 2.2% |
| <0.7μ | 30.9% | 21.5% | 16% | 15.9% |

Notes:
Shimadzu centrifugal sedimentation type particle size tester, Model CP-50 used. Solvent used, distilled water; Dispersant used, 0.2% $(NaPO_3)_6$; Temperature used, 29° C.

When the 60 mesh pass portion of the composition was tested by the same method as described above, the talc content of the composition was found to be 23.1% by weight. When the talc containing filtrate, which occured during the dehydration of the polymerization mixture, was filtered and dried, there was obtained about 310 g of talc mixture. When it was tested by the same method as described above, the talc content was found to be 93%. This indicated that the filtrate was composed of substantially all talc.

Samples of the compositions obtained in Example 1 and Comparative Example 1 were impregnated and hardened with methyl methacrylate. Thin sections were cut from the hardened samples and were observed with a microtome through an electron microscope. FIG. 3 depicts the specimen obtained in Example 1. In the photomicrograph of FIG. 3, the black lines or plates delineated A depict the talc particles and the gray circles delineated B represent the primary polymer particles of polyvinyl chloride formed in a manner whereby surrounding the talc, indicating that the talc is uniformly distributed within the polymer grains. FIG. 4 depicts the specimen obtained in Comparative Example 1. From FIG. 4 it is noted that virtually all of the talc particles (black parts) remain separate from the grains of polymer and the talc is attached to the polymer grains through the medium of the PEO used as a dispersant, that is there is an intervening material between the talc and the polymer particle.

Then the composition was molded to form a number of samples to determine their physical properties. A mixture (hereinafter called "MB") comprising 1 part tribasic lead sulfate, 0.5 part dibasic lead stearate, 1.5 parts lead stearate, 0.5 part calcium stearate, 0.5 part barium stearate, 0.2 part polyethylene wax (product of Hoechst GmbH, marketed under the trademark "PE-130") and 0.25 part pigment was prepared. In a 20 liter Super-mixer (made by Kawada Manufacturing Co.,Ltd) 2.56 kg of the composition of this invention, 2.26 kg of Kane-vinyl S-1001 (vinyl chloride resin manufactured by Kanegafuchi Chemical Ind. Co,Ltd) and 180 g of MB were mixed at a low speed up to a temperature of 70° C.; then further mixed at an increased speed up to a temperature of 110° C. The resultant blend was immediately cooled and discharged from the mixer at 70° C., to obtain a composition of this invention (having a talc content of 15% by weight).

For referential purposes, as Referential Example 1, 0.75 kg of Talc A, 4.06 kg of Kane-Vinyl S-1001, 180 g of MB and 7.5 g of EBS were mechanically mixed to produce a composite mixture.

The above compositions were molded with an extruder 40 mm in diameter (produced by Tabata Machine Mfg Co,Ltd, Model HV-40-28, Dullmage, screw-Cr=3.2 Cr2=2.2) to produce belts 3 mm in thickness and 60 mm in width.

To determine their tensile properties, the belts were pressed to a thickness of about 2.5 mm at 180° C. and dumbbell test pieces specified in JIS K-6745 were cut out of the pressed belts and subjected to tests for tensile properties at 23° C. The interval between the chucks was 80 mm and the test speed was 10 mm/min.

To determine impact strength, the belts were pressed to a thickness of about 2.5 mm, and test pieces were cut in squares of 30 mm×30 mm from the pressed belts, mounted in a DuPont type impact tester using a dart ⅜ inch in diameter and 2 kg in weight. The height of the dart falling at which one half of the test pieces were broken by the impact was found, and the value was proportionated for the dat weight of 300 g. The results are shown in Table 2 below.

TABLE 2

|  | DuPont Impact $H_{50}$ (cm) | Tensile strength (kg/cm$^2$) | Tensile elongation (%) |
|---|---|---|---|
| Example 1 | 480 | 566 | >100 |
| Comparative Example 1 | 310 | 571 | 71 |
| Referential Example 1 | 280 | 576 | 63 |

The DuPont impact strength for the article of Comparative Example 1 was 310 cm, a value roughly equal to that for the article of Referential Example 1, which was obtained by simply mechanically mixing talc and polyvinyl chloride; whereas, the results for the article of the inventive Example 1, was 480 cm, a vaue representing a surprising improvement in impact resistance.

In the working example of this invention, the composition was obtained by wetting the talc with monomer or monomer mixture and thereafter adding water thereto and polymerizing the resulting mixed system. In the comparative example, the polymerization was performed by a conventional method. Because of the difference in the manner of polymerization, the conditions of the talc in the two compositions were radically different as shown in the photomicrographs of FIGS. 3 and 4, and the values of the impact resistances differed widely as discussed above, in Table 2. In the referential example, there was mechanical mixing or blending to the talc and the polymer particles and hence there was no direct contact between the talc and the polymer particles; rather, there was an intervening material therebetween. Similarly, with the comparative Example 1 composition, there was an intervening material between the talc particles and the polymer particles.

EXAMPLES 2, 3 and 4.

By following the procedure of Example 1, 0.8 kg of talc A, 8 g of EBS and 2.3 g of OPP were placed and treated in the polymerization vessel and, with the inner atmosphere displaced with nitrogen, 4.58 kg of vinyl chloride monomer was added thereto, and the resultant mixed system was stirred at room temperature for 20 minutes, with the impeller operated at 1000 rpm. Then, 8.3 kg of deionized water having 3.21 g of PEO dissolved therein was added and the resultant system was polymerized, to produce 4.4 kg of a composition having a talc content of 17.9% by weight (Example 2).

Similarly, 1.08 kg of talc A, 10.8 g of EBS and 2.15 g of OPP were placed in the polymerization vessel, treated for removal of formed oxygen and displaced with nitrogen. Then, 4.3 kg of vinyl chloride monomer was added and the resultant mixed system was stirred at room temperature for 20 minutes, with the impeller operated at 1000 rpm. Subsequently, 8.3 kg of deionized water having 3.01 g of PEO dissolved therein was added, and the resulting system was polymerized at 58° C., to obtain 4.5 kg of a composition having a talc content of 23.9% by weight (Example 3).

Similarly, 1.88 kg of talc A, 13.8 g of EBS and 1.75 g of OPP were placed in a polymerization vessel, treated for removal of formed oxygen and replaced with nitrogen. Then, 3.5 kg of vinyl chloride monomer was added and the resulting mixed system was was stirred at room temperature for 20 minutes, with the impeller operated at 1000 rpm. Susequently, 8.3 kg of water having 2.45 g of PEO dissolved therein was added and the resultant system was polymerized, to obtain 4.6 kg of a composition having a talc content of 40% by weight (Example 4).

To test for physical properties, the compositions were mixed with Knae-vinyl S-1001, in relative amounts, such that the talc contents, would be adjusted to 15% by weight by the procedure of Example 1.

In Example 2, 4.19 kg of the composition was mixed with 0.63 kg of Kane-vinyl S-1001, and 180 g of MB.

In Example 3, 3.14 Kg of the composition was mixed with 1.68 kg of Kane-vinyl S-1001 and 180 g of MB.

In Example 4, 1.88 kg of the composition was mixed with 2.94 kg of Kane-vinyl S-1001 and 180 g of MB.

As in Example 1, the mixtures were stirred, molded and then tested for tensile strength and DuPont impact resistance. The results are shown in Table 3.

TABLE 3

|  | DuPont Impact $H_{50}$ (cm) | Tensile Strength (kg/cm$^2$) | Tensile elongation (%) |
|---|---|---|---|
| Example 2 | >500 | 568 | >100 |
| Example 3 | >500 | 568 | >100 |
| Example 4 | 430 | 567 | >100 |

In both Examples 2 and 3, the values of impact strength were greater than 500 cm, indicating that the articles had high levels of impact strength and greater than for Example 1. In Example 4, the value of impact strength was 430 cm, indicating that the article had a slightly lower impact strength than for those of Examples 1, 2 or 3. However, this value was much greater than the values for the comparative example 1 or the referential example 1. This clearly shows how effective is the invention in the surprising improvement of impact strength.

When the talc content of the composition increases and the molded article is required, for example, to have a talc content of 15% by weight, vinyl chloride resin containing no talc can be added to the talc containing composition. It appears that there is slight degradation of the impact strength in proportion to the amount of resin having not talc which is added. This may explain the slight decline observed for the impact strength of the sample of Example 4. As above stated, the produced composition is desired to have a talc content of not more than about 50 weight percent so that the decline of impact strength from the diluting use of non-talc containing resins can be controlled.

EXAMPLE 5

Talc that was produced in China, was pulverized and classified in a Super-Micron mill to produce Talc D of Table 1. By further classifying talc D, there were obtained Talc B and Talc C.

Compositions using these talc B, C and D were produced by using the formulation and procedure of Example 1. Again, by following the procedure of Example 1, compounds containing 15% by weight of various talc were produced from the compositions, and then molded and tested for DuPont impact strength. The results are shown in Table 4.

For the purpose of reference, compounds containing 15% by weight of talc B, C and D, respectively, and also containing Kane-vinyl S-1001, were prepared similarly to Referential Example 1, and the resulting blends were molded.

TABLE 4

| Example 5 | | Referential Example | |
|---|---|---|---|
| Talc used | DuPont Impact $H_{50}$ (cm) | Talc used | DuPont Impact $H_{50}$ (cm) |
| A (Ex. 1) | 480 | A (Ref. Ex. 1) | 280 |
| B | 457 | B | 250 |
| C | 381 | C | 191 |
| D | 163 | D | 98 |

In the articles of the working examples of the invention, and of the referential example, the values of DuPont impact strength were heavily affected by the particle diameter of talc. The graph of FIG. 1, drawn by plotting the percentage of talc particles having Stokes diameters exceeding $10\mu$ as the function of the value of DuPont impact strength, with the horizontal axis graduated for the former value and the vertical axis for the latter value, clearly, shows that the DuPont impact strength is determined by the percentage of talc particles exceeding $10\mu$.

Comparison of the results obtained for the articles of the working example of this invention with those obtained for the articles of the referential example clearly shows the notable effect of this invention, even where the percentages of talc particles of specified diameters are the same. In the working example of the invention, when the percentage of talc particles exceeding $10\mu$ in Stokes diameter increased over 20%, the impact strength was inferior to that obtained for the article of the referential example using talc of a grade in which particles of Stokes diameters exceeding $10\mu$ accounted for not more than 10% of the total. This means that the effect of the present invention becomes insignificant when the percentage rises above 20%. Thus, for the purpose of the invention, it is desirable to adopt talc have a size distribution wherein not more than 20% exceed $10\mu$.

The size distribution of talc was determined by measuring Stokes diameters of the particles of a given sample talc at 29° C. in a Shimadzu cetrifugal sedimentation particle size tester, Model CP-50, using 0.2% $(NaPO_3)_6$ as the dispersant and distilled water as the solvent.

EXAMPLE 6

Compositions having various talc contents were prepared from compositions obtained by the procedure used in Example 1 and in Comparative Example 1, and then tested for DuPont impact strength. The results are shown in FIG. 2. By way of referential example, a compound having roughly equal talc content (Talc A) and containing Kane-vinyl S-1001 was molded and similarly tested. The results are shown in FIG. 2.

The compositions were prepared as follows:

A composition comprising 1.71 kg of the composition of Example 1, mixed with 3.1 kg of Kane-vinyl S-1001 and 192 g of MB (talc content 10% by weight).

A composition of Example 1, with talc content of 15% by weight).

A composition comprising 3.41 kg of the composition of Example 1, mixed with 1.42 kg of Kane-vinyl S-1001 and 170 g of MB (talc content of 20% by weight).

A composition comprising 4.85 kg of the composition of Example 1, mixed with 153 g of MB (talc content 28.4% by weight).

A composition comprising 2.16 kg of the composition of the Comparative Example 1, mixed with 2.65 kg of Kane-vinyl S-1001 and 192 g of MB (talc content of 10% by weight).

The composition of the comparative example of Example 1 (talc content of 15% by weight).

A composition comprising 4.33 kg of the composition of the Comparative Example 1, mixed with 0.5 kg of Kane-vinyl S-1001, and 170 g of MB (talc content of 20% by weight).

A composition comprising 4.84 kg of the composition of the Comparative Example 1, mixed with 166 g of MB (talc content of 22.3% by weight).

A composition comprising 0.5 kg of talc A, mixed with 4.31 kg of Kane-vinyl S-1001 and 192 g of MB (talc content 10% by weight).

The composition of the referential example in Example 1 (talc content of 15% by weight).

A composition comprising 1.0 kg of Talc A, mixed with 3.83 kg of Kane-vinyl S-1001 and 170 g of MB (talc content of 20% by weight).

A composition comprising 1.25 kg of talc A, mixed with 3.59 kg of Kane-vinyl S-1001 and 160 g of MB (talc content of 25% by weight).

In the case of the articles of the comparative examples, the values of impact strength were slightly higher than the values obtained for the articles of the referential examples produced by mechanically mixing talc with pvc. In the case of the articles of the working examples of this invention, when the talc contents were below about 17 to 18% by weight, the values of impact strength were equal to or higher than the value found for pure polyvinyl chloride. Even when the talc contents exceeded 20% by weight, the values of impact strength were more than twice the values found for the articles of the comparative examples and the referential examples. When the talc contents further increased, the differences narrowed down and the values of DuPont impact strength fell below 100 cm. Articles of such low values of DuPont impact strength have no practical significance. Thus, for the production of molded articles, the talc contents of articles are desired to be kept under about 40% by weight.

EXAMPLES 7, 8 and 9

In an autoclave having an inner volume of 16 liters, 1.34 kg of talc A, 13.4 g of EBS, 2.03 g of OPP and 21.4 g of dibutyl maleate (16% by weight based on tac), were placed and treated for removal of formed oxygen and replaced with nitrogen. Then, 4.05 kg of vinyl chloride monomer was added thereto and the resultant mixed system was stirred at room temperature for 20 minutes at a rate of 1000 rpm. Subsequently, 3.3 kg of deionized water having 2.84 g of PEO dissolved therein was added, and the resultant system was polymerized and dried by following the procedure of Example 1, to afford 4.45 kg of a composition containing 29.7% by weight of talc (Example 7).

By repeating the procedure described above, except dibutyl maleate was substituted by 21.4 of dibutyl phthalate, there was obtained 4.4 kg of a composition containing 30.1% by weight of talc (Example 8).

Similarly, by repeating the procedure, except 21.4 g of itaconic anhydride was used instead, there was obtained 4.52 kg of a composition containing 29.1% by weight of talc (Example 9).

Figure 5:
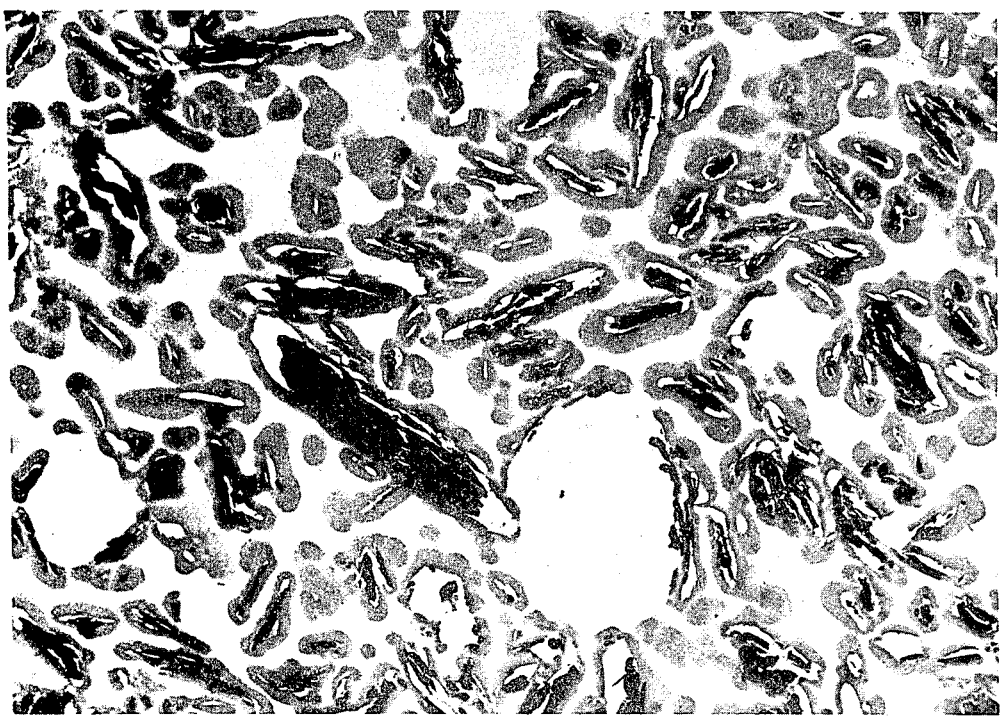
Figure 6:
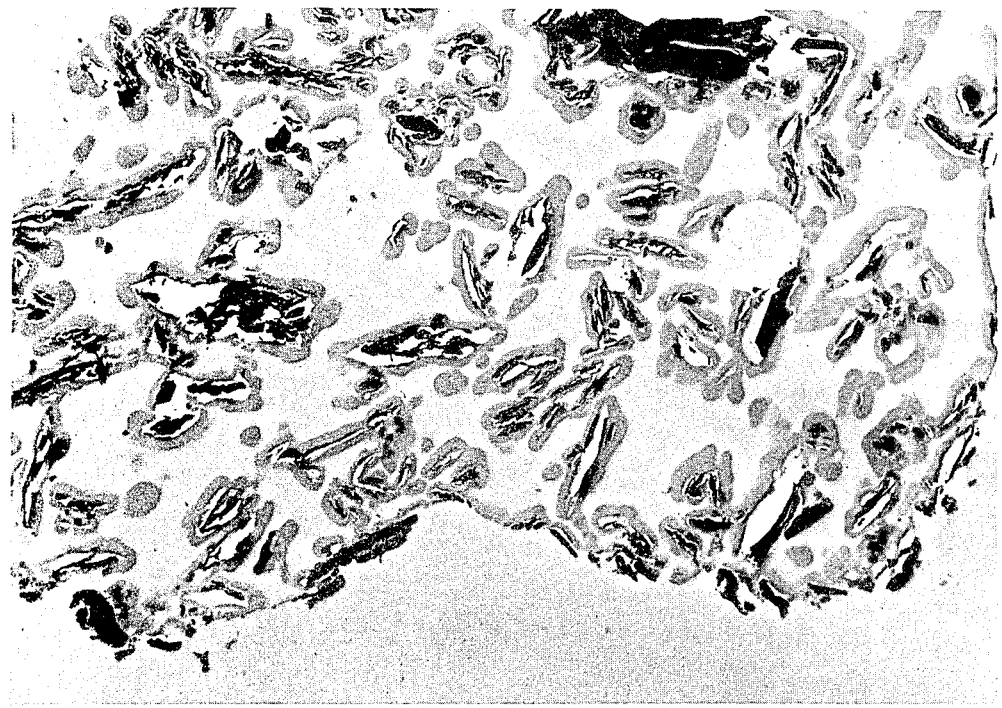
Figure 7:
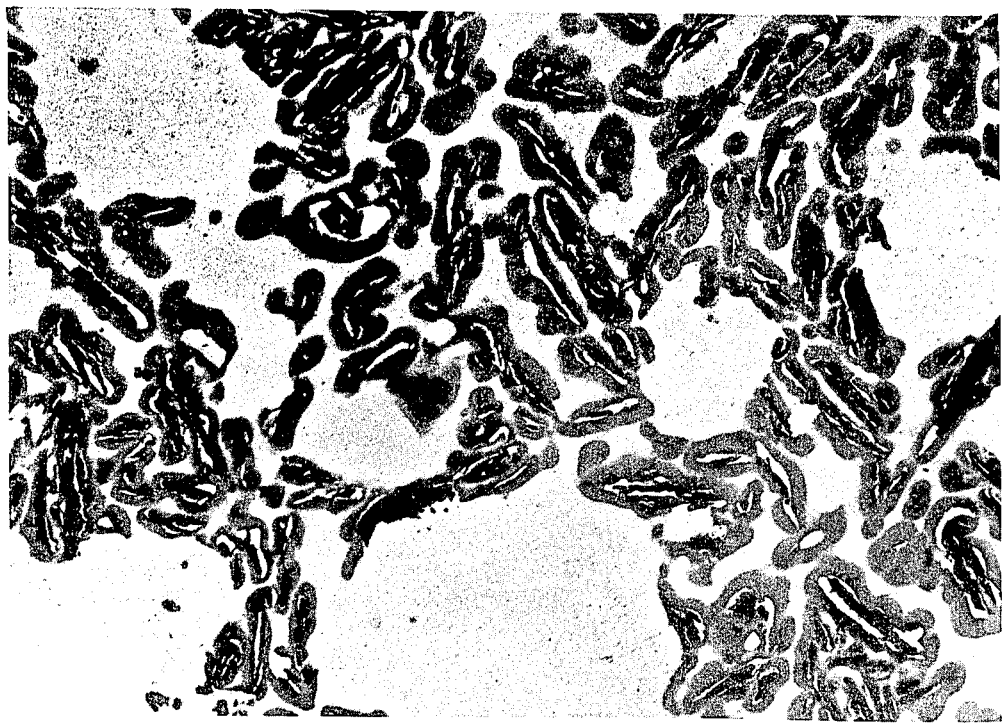

The photomicrographs of the interiors of these compositions are shown in FIGS. 5, 6 and 7 respectively.

In the polymer of Example 1, although talc was dispersed inside of the polymer particles or grains, talc was observed also adhering to the outside of the grains without any intervening material therebetween. In the compositions of Examples 7, 8 and 9, the talc is practically all embedded within the polymer particles.

This fact indicates that the addition of the aforementioned polar compounds serves to facilitate the embedding of the talc within the polymer grains.

The compositions of Examples 7, 8 and 9 were mixed with Kane-vinyl S-1001, similarly to Example 1, to thereby produce a composition having a talc content of 15% by weight. These compositions were then molded and tested for DuPont impact strength. The results are shown in Table 5.

TABLE 5

|  | DuPont Impact Strength $H_{50}$ (cm) |
|---|---|
| Example 7 | >500 |
| Example 8 | >500 |
| Example 9 | >500 |

For all the molded articles, the values of DuPont impact strength invariably exceeded 500 cm. This indicates that the addition of polar compounds served to enhance the DuPont Impact strength.

EXAMPLE 10

The same procedure was followed after Example 1, except the order of adding monomer and other additives, that is instead of using the monomer or monomer mixture to wet the talc in the first step.

To a slurry mixture containing 1.34 kg of talc A and 8.3 kg of deionized water, 1.34 g of EBS and 2.03 g of OPP were added. Then, 4.05 kg of vinyl chloride monomer was added thereto under nitrogen atmosphere and stirred at 1000 rpm for 45 minutes. Then, the resultant mixture was polymerized at 58° C. after adding a solution of 100 cc water with 2.84 g of PEO. The properties of the composition prepared by use of the foregoing composition are shown in Table 6.

EXAMPLES 11 and 12 and REFERENTIAL EXAMPLE 2

The procedure of Example 1 was similarly followed, except that 0.5 g of lead stearate, in place of 0.2 g of the same, and a Full-Flighted Screw ($CR_1=3.6$; $CR_2=2.1$) in place of the Dullmage screw were employed (Example 11).

The same procedure was repeated in case of using the composition of Example 10 and of Reference Example 1, respectively (Example 12 and Referential Example 2).

The results are shown in Table 6.

It should be noted that in Example 10, at least one broad surface of the talc particles was directly bonded to the polymer particles without any intervening material therebetween, in contrast to the comparative example wherein by use of conventional polymerization methods the talc was attached to the polymer particles with an intervening material between the polymer particle and the talc surface.

In the Table it can be seen that the Examples 10, 11 and 12 were substantially higher in impact strength than the referential example. Also, Example 10 wherein the talc was not first wetted by use of monomer or monomer mixture, rather mixed in a slurry with aqueous medium first then adding the monomer or monomer mixture, the impact strength was still much higher than the referential example 2.

TABLE 6

|  | DuPont Impact Strength $H_{50}$ (cm) | Tensile Strength (kg/cm$^2$) | Tensile elongation (%) |
| --- | --- | --- | --- |
| Example 10 | 480 | 540 | >100 |
| Example 11 | 553 | 550 | >100 |
| Example 12 | 450 | 540 | >100 |
| Referential Example 2. | 120 | 560 | 50 |

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A method of manufacturing vinyl chloride resin composition wherein talc is embedded within vinyl chloride base particles, comprising the steps of mixing said talc with either vinyl chloride monomer or a mixture of a vinyl chloride monomer in major proportions and other vinyl type monomer copolymerizable therewith in minor proportions, until said talc is substantially wetted with said monomer or monomer mixture; then adding to the resulting blend an aqueous medium and optionally a dispersant; and then polymerizing the resulting blend using an initiator soluble in said monomer or monomer mixture.

2. The method of claim 1, wherein a compound having a polar group and soluble in said monomer or monomer mixture is dissolved in said monomer or monomer mixture prior to polymerization.

3. The method of claim 2, wherein said polar group is a member selected from the group consisting of carboxylic acid, alcohol, amide and derivatives thereof.

4. The method of claim 1, wherein said talc comprises not more than 20% of particles having Stokes diameters exceeding 10μ.

5. The method of claim 1, wherein said initiator is alternatively mixed in said talc prior to said wetting, or dissolved in said monomer or monomer mixture, or blended in said resultant blend prior to said polymerization.

6. The method of claim 1, wherein water is adhered to said talc in an amount below 1 percent.

7. The method of claim 1, wherein said mixing of said talc with said monomer or monomer mixture is done by vigorous agitation to provide ample wetting of said talc.

8. The method of claim 1, wherein the said polymerization is started within one hour of said mixing of said talc with said monomer or monomer mixture.

9. The method of claim 1, wherein said initiator is an organic peroxide or an azo compound.

10. The method of claim 1, wherein said dispersant is a water soluble high polymer.

11. The method of claim 1, wherein at the time of mixing of said talc and said monomer or monomer mixture, an amide compound in an amount of from 0.1 to 25% based on the weight of said talc, is added prior to polymerization.

12. A method of molding polyvinyl chloride resin containing talc, comprising the steps of mixing said talc with either vinyl chloride monomer or a mixture of vinyl chloride monomer in major proportion and other vinyl type monomer copolymerizable therewith in minor proportion, until said talc is substantially wetted with said monomer or monomer mixture; adding to the resulting blend an aqueous medium and optionally a dispersant; polymerizing the resulting blend using an initiator soluble in said monomer or monomer mixture; adding a stabilizer and a slidant to the polymerization product, and molding same; and wherein the talc content is limited to between 1 and 30 weight percent.

13. The method of claim 12, wherein the resulting particles of talc containing polyvinyl chloride are 100 mesh or smaller.

14. A vinyl chloride resin composition, comprising talc embedded within particles formed by polymerizing vinyl chloride monomer or a mixture of vinyl chloride monomer in major proportion and a vinyl type other monomer copolymerizable therewith in minor proportion; said talc is first mixed with either said monomer or said mixture until said talc is substantially wetted with said monomer or monomer mixture, then an aqueous medium is added to the resulting blend, and then polymerized; and wherein said talc has a size distribution wherein not more than 20 percent of said talc particles exceed Stokes diameter of 10μ; and wherein said talc content of the resulting composition is from 1 to 30 weight percent.

15. The composition of claim 14, wherein the resulting composition is mixed with polyvinyl chloride containing not more than 1 percent by weight of talc.

16. The composition of claim 14, wherein the talc containing composition is mixed with a polyvinyl chloride having no substantial amount of talc therein.

* * * * *